April 13, 1954  H. G. HEROLD  2,674,796
PIVOTED UTILITY CUTTING TOOL HAVING A LATCHING MECHANISM
Filed Dec. 26, 1951
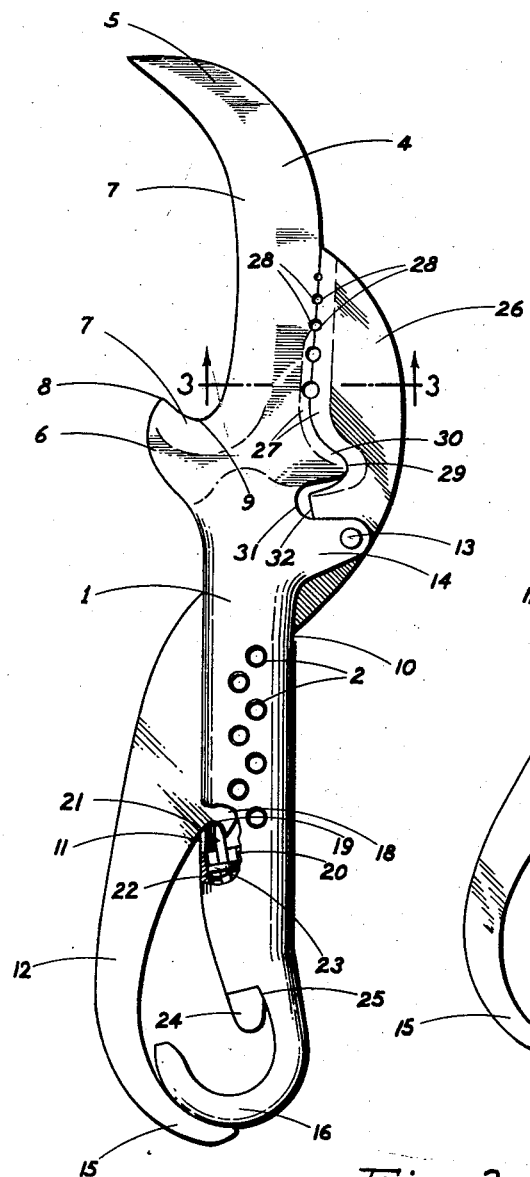
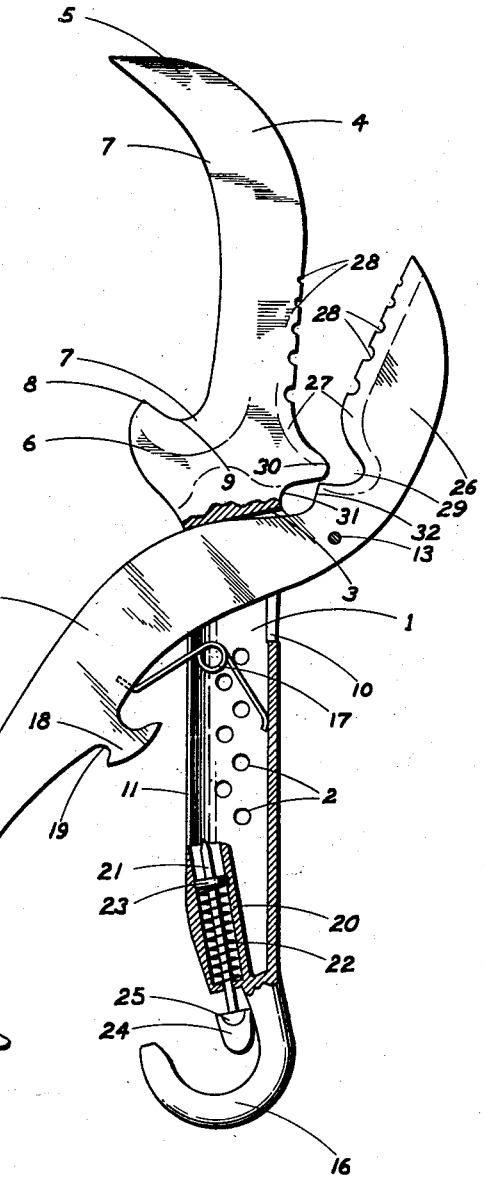
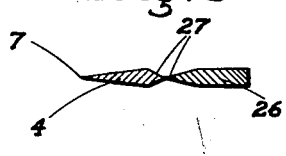
INVENTOR
Homer G. Herold
BY Webster & Webster
ATTORNEYS Patented Apr. 13, 1954

2,674,796

UNITED STATES PATENT OFFICE 2,674,796

PIVOTED UTILITY CUTTING TOOL HAVING A LATCHING MECHANISM

Homer G. Herold, Jamestown, Calif.

Application December 26, 1951, Serial No. 263,378

1 Claim. (Cl. 30—262)

The present invention is directed to, and it is a major object to provide, a novel hand-supported cutting tool adapted to many uses, although especially designed for use by electricians to cut and strip insulation from electric wires, or other similar operations in wire handling.

Another important object of this invention is to provide a utility cutting tool which embodies a novel combination of working parts; there being a fixed handle having a forwardly projecting integral main blade thereon of unique design, and a secondary blade pivoted in connection with the fixed handle, and actuated by a movable handle for scissors-like cooperation with a sharpened portion of the outer or back edge of said main blade.

A further object of the invention is to provide a utility cutting tool, as in the preceding paragraph, wherein the movable secondary blade and the corresponding sharpened portion of the outer or back edge of the fixed blade are formed with sharpened, cooperating semi-circular notches for ring-cutting the insulation about wire.

An additional object of the invention is to provide a utility cutting tool of the type described wherein the fixed handle is tubular and the movable handle is flat; said handles being secured together in pivotal and guided connection in a novel manner.

A still further object of the invention is to provide a novel latch mechanism operative to releasably secure the movable handle in a closed position with respect to the fixed handle; there being spring means tending to urge the handles apart.

It is also an object of the invention to provide a utility cutting tool which is designed for ease and economy of manufacture, and a tool which is very handy and convenient to use.

A still further object of the invention is to provide a practical and reliable utility cutting tool, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the utility cutting tool with the handles, and the secondary blades, latched in closed position.

Fig. 2 is a sectional elevation, but shows the handles in unlatched position and the secondary blade in open position.

Fig. 3 is a transverse section on line 3—3 of Fig. 1.

Referring now more particularly to the characters of reference on the drawings, the novel utility cutting tool comprises an elongated tubular fixed handle 1; such handle being formed in the length thereof with grip holes 2.

At its front end the tubular handle 1 merges into an abutment 3, and ahead thereof includes a forwardly projecting or longitudinal main blade 4.

The main blade 4 is rounded or curved laterally at its tip portion, as at 5, and at its rear end said blade includes a lateral projection 6 which extends outwardly in the same direction as the curvature of the tip 5.

The longitudinal main blade 4 with its curved tip 5, and its lateral projection 6, define an inner or cutting edge 7 of generally C-shape, and which is sharpened for its full longitudinal extent. The tip 8 of the lateral projection 6 lies somewhat ahead of the sharpened cutting edge portion of the lateral projection 6 whereby to form a cutting crotch 9 adapted to receive an insulated wire therein, whereby rotation of the tool will then ring-cut the insulation without likelihood of the tool slipping away from the wire.

The longitudinal main blade 4 is usable at its outer end portion for all types of knife operations, but is especially adapted for use to penetrate and longitudinally slit the insulation on electric wire.

Directly rearward of the abutment 3 and on the outer or back edge thereof the fixed handle 1 is formed with a relatively short longitudinal slot 10, while on the opposite or inner side said handle is formed with an elongated slot 11.

A flat movable handle 12 extends through the slots 10 and 11 and is pivotally supported on a cross pin 13 carried between a pair of ears 14 which project laterally from the fixed handle 1 on opposite sides of the relatively short longitudinal slot 10.

The movable handle 12 is slightly curved in a laterally inward direction, as shown, and at its rear end portion 15 said handle 12, when closed, is adapted to cooperate in substantially matching, lapping relation with a semi-circular or hook-shaped guard 16 which is formed integral with the fixed handle 1 and opens generally toward the movable handle 12.

A spring 17 works through the slot 11 between the fixed handle 1 and movable handle 12 intermediate their ends, tending to open said latter handle.

The movable handle 12 is normally maintained in a closed latched position, as in Fig. 1, by the latching mechanism as shown in detail in Fig. 2, and which comprises the following:

Intermediate its ends the movable handle 12 is formed with a laterally inwardly projecting catch element 18 which defines a rearwardly opening catch notch 19. When the movable handle 12 is closed, the catch element 18 projects into the handle 1 through the notch 11 and lies directly ahead of the open front end of a longitudinal guide sleeve 20 formed in said handle 1. In such position a catch plunger 21 is advanced out of the sleeve 20 by a compression spring 22 and engages in the catch notch 19 in holding relation to the movable handle 12.

The compression spring 22 is disposed in the sleeve 20 about the catch plunger 21 between the closed rear end of said sleeve and a collar 23 fixed on the plunger adjacent but short of its forward end.

The plunger 21 projects in slidable relation rearwardly out of the sleeve 20 and is there formed with a rounded finger-engaging head 24 having one flat side 25. The relationship of the parts is such that when the flat side 25 is in facing relation to the near part of the hoop-shaped guard 16, such head 24 may be fully advanced, as in Fig. 1, to permit the plunger 21 to engage in the catch notch 19.

However, upon retraction of the catch plunger 21 by the head 24 and part-turning of said head, as in Fig. 2, the head abuts the near part of the hook-shaped guard 16 and holds the plunger 21 retracted. This is the position of the parts when the utility cutting tool is being used, especially when the handle 12 is being manipulated.

The handle 12 serves to actuate a longitudinally extending secondary blade 26 formed integral with the movable handle 12 ahead of the cross pin 13; such secondary blade 26 on the inner edge, and the corresponding portion of the outer or back edge of the main blade 4, having sharpened cooperating cutting edges 27.

Such cooperative cutting edges 27 also have a row of matching sharpened semi-circular notches 28 therein defining openings of progressively decreased diameter, and which openings correspond to electric wire diameter.

In addition to the secondary blade 26 serving for general utility shear or scissors-like cutting, the notches 28—using the proper sized ones thereof—are used to ring-cut the insulation about the electric wire preparatory to stripping the insulation from the wire beyond the cut.

Adjacent the rear end thereof the longitudinal secondary blade 26 is formed with a cutting notch 29, and a laterally outwardly projecting cutting nub 30 is formed on the back edge of the main blade 4; these parts being sharpened and the nub 30 working into the notch 29 upon closing of the secondary blade 26. Here again are cutting surfaces especially useful by an electrician for cutting insulation or wire.

The laterally inwardly extending notch 31 defined between the nut 30 and the ears 14, and into which notch 31 a shouldered portion 32 works when the movable blade 12 is closed, serves admirably for stripping out insulation from a wire. The wire is laid in the notch 31 and then the movable handle 12 is closed sufficiently for the shoulder 32 to engage the insulation, imparting sufficient friction grip thereto so that the wire and insulation may be readily manually stripped apart.

The movable handle 12 is limited in its outward or opening motion by engagement with the abutment 3, as in Fig. 2.

The described utility cutting tool, while being very compact, provides for handy and convenient cutting operations of sundry kinds, as performed by electricians. The tool, while especially designed for electricians, is nevertheless adaptable to many other uses, as—for example—vine or shrub pruning.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

In a utility cutting tool having a pair of cooperating blades, handles projecting from the blades, means pivoting the blades together adjacent the handles for opening and closing movement and spring means tending to open the blades and separate the handles, one handle being hollow; a releasable self-closing catch device between the handles disposed within the hollow handle in catching and concealed relation when the blades are closed, and means to release the catch device comprising a head projecting from the outer end of the hollow handle for finger manipulation and movement lengthwise of the handle, and a guard extending outwardly from the outer end of said hollow handle and curving laterally and inwardly over the head beyond and in clearance relation to the same.

References Cited in the file of this patent

UNITED STATES PATENTS

| Number | Name | Date |
| --- | --- | --- |
| 69,388 | Barney | Oct. 1, 1867 |
| 99,784 | Norris | Feb. 15, 1870 |
| 123,497 | McCarraher | Feb. 6, 1872 |
| 137,821 | Broadbooks | Apr. 15, 1873 |
| 160,392 | Chase | Mar. 2, 1875 |
| 367,843 | Pierce | Aug. 9, 1887 |
| 700,617 | Cobaugh | May 20, 1902 |
| 838,514 | Baker | Dec. 18, 1906 |
| 888,606 | Gemeny | May 26, 1908 |
| 1,187,386 | Pehrson | June 13, 1916 |
| 1,388,398 | Adams | Aug. 23, 1921 |
| 2,054,973 | Ferguson | Sept. 22, 1936 |
| 2,431,970 | Schwartz | Dec. 2, 1947 |

FOREIGN PATENTS

| Number | Country | Date |
| --- | --- | --- |
| 3,357 | Great Britain | Mar. 10, 1886 |